United States Patent [19]
Rosenberg

[11] Patent Number: 5,630,443
[45] Date of Patent: May 20, 1997

[54] BUOYANT BODY CONTROL DEVICE

[76] Inventor: Peretz Rosenberg, 30 046, Moshav Beit Shearim, Israel

[21] Appl. No.: 537,956

[22] Filed: Oct. 2, 1995

[30] Foreign Application Priority Data

Oct. 3, 1994 [IL] Israel .......................... 111126

[51] Int. Cl.$^6$ .......................... F16K 31/22; F16K 33/00
[52] U.S. Cl. .......................... 137/393; 137/433; 141/198
[58] Field of Search .......................... 137/393, 400, 137/401, 402, 403, 414, 415, 430, 433; 141/198

[56] References Cited

U.S. PATENT DOCUMENTS

| | | | |
|---|---|---|---|
| 2,442,927 | 6/1948 | Horvath | 137/403 |
| 2,685,301 | 8/1954 | Dreier | 137/403 |
| 2,727,527 | 12/1955 | Horvath | 137/403 |
| 2,999,509 | 9/1961 | Hankison et al. | 137/415 |
| 3,153,247 | 10/1964 | Walsh | 137/401 |
| 3,358,704 | 12/1967 | Wyatt et al. | 137/393 |
| 3,495,617 | 2/1970 | Zifferer | 137/433 |
| 4,094,327 | 6/1978 | Brandelli | 137/403 |
| 4,574,826 | 3/1986 | Johnson | 137/403 |
| 4,887,635 | 12/1989 | Johnson | 137/403 |
| 4,945,944 | 8/1990 | Chen | 137/403 |

*Primary Examiner*—George L. Walton
*Attorney, Agent, or Firm*—Benjamin J. Barish

[57] ABSTRACT

A control device includes a liquid reservoir and a buoyant body movable to either an upper control position or to a lower control position in response to the level of the liquid in the reservoir. The outer surface of the buoyant body includes a cavity circumscribed by a rim engageable with a surface of the reservoir in the lower control position of the buoyant body to define a chamber isolated from the reservoir. A passageway normally connects the chamber to a source of low pressure but is connectible to a source of higher pressure, such that during the filling of the reservoir with the liquid, a low pressure in the chamber normally holds the buoyant body in the lower control position until the chamber is connected by the passageway to the higher pressure to permit the buoyant body to move by buoyancy to the higher control position.

19 Claims, 2 Drawing Sheets

BUOYANT BODY CONTROL DEVICE

FIELD AND BACKGROUND OF THE INVENTION

The present invention relates to control devices controlled by a buoyant body.

Devices controlled by buoyant bodies are used in a number of applications. One common application is as an actuator for controlling a valve or the like in response to liquid level, e.g., in a toilet flushing system. However, in the conventional devices including a buoyant body actuator, the buoyant body moves continuously in response to changes in liquid level so that the actuating point is not precise. As a result, considerable quantities of water are wasted in such a flushing system since the tank reservoir begins to refill while the valve is still open and the water is still being flushed.

OBJECTS AND BRIEF SUMMARY OF THE INVENTION

An object of the present invention is to provide a buoyant body control device having advantages in the above respects.

According to the present invention, there is provided a control device comprising a liquid reservoir having an inlet for feeding a liquid into the reservoir and an outlet for discharging the liquid from the reservoir; and a buoyant body within the reservoir and movable to an upper control position and to a lower control position in response to the level of the liquid in the reservoir. The buoyant body includes an outer surface normally engageable with a surface of the reservoir in the lower control position but movable by buoyancy away from the surface of the reservoir towards the upper control position during the filling of the reservoir with the liquid. The outer surface of the buoyant body includes a cavity circumscribed by a rim engageable with the surface of the reservoir in the lower control position of the buoyant body to define a chamber isolated from the reservoir when the liquid is at a low level within the reservoir. The device includes a passageway which normally connects the chamber to a source of low pressure but which is connectible to a source of higher pressure, such that during the filling of the reservoir with the liquid, the low pressure applied to the chamber by the low pressure source normally holds the buoyant body in the lower control position until the chamber is connected by the passageway to the source of higher pressure to permit the buoyant body to move by buoyancy to the upper control position.

It will thus be seen that in such a control device, the buoyant body does not move continuously in response to the change in liquid level as the reservoir is filled, but rather is retained in its initial lower position, despite its buoyancy, until the pressure applied to the mentioned chamber via the passageway is increased to release the buoyant body and to permit it to move by buoyancy to its upper position. Since the buoyancy force has substantially increased during this filling of the reservoir, the movement of the buoyant body to its upper position is effected by a quick snap-action. In addition, since the buoyant body is thus retained in its lower position, not by its weight but rather by the low-pressure chamber, the buoyant body may be of relatively low weight as compared to its volume so that the buoyant body will not assume its lower control position until the reservoir has been substantially emptied of the liquid.

As will be described more particularly below, such a control device may be used as an actuator for actuating a valve at precise control points in response to liquid level. Such a control device may be used in many other applications, for example as a dosing device for dividing a liquid into predetermined doses or quantities.

Conceivably, the low-pressure chamber could be formed between any surface of the buoyant body and the reservoir in the initial lower position of the buoyant body. In most cases, however, the low pressure chamber would be formed between the bottom surfaces of the buoyant body and the reservoir; also, the source of low pressure would be the atmosphere.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
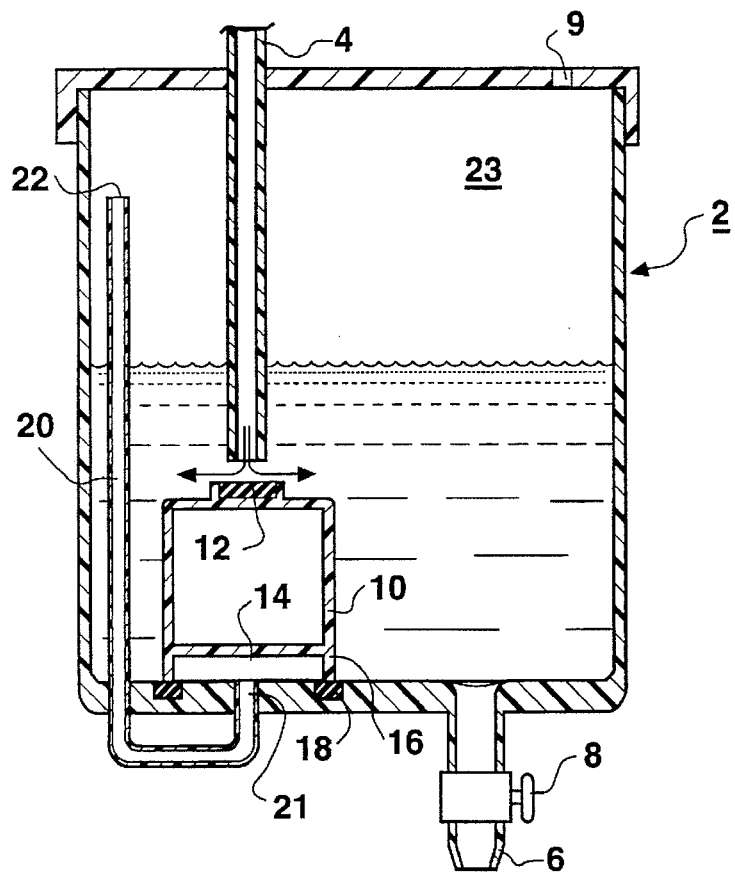
FIG. 1 illustrates one form of liquid flow control device constructed in accordance with the present invention, in which the buoyant body therein is in its initial, lower control position.
Figure 2:
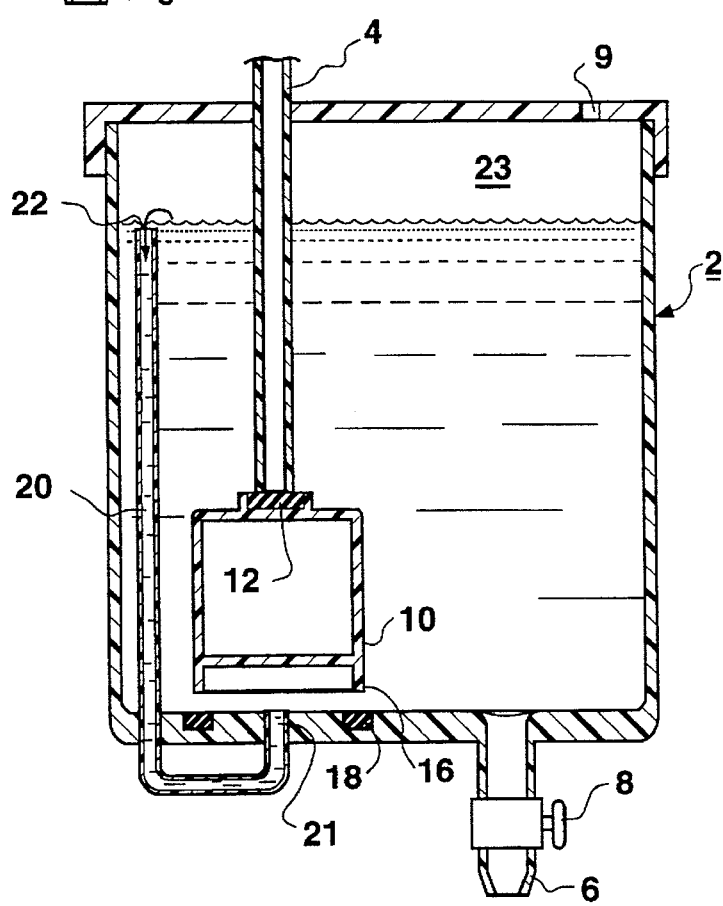
FIG. 2 illustrates the control device of FIG. 1 with the buoyant body in its upper control position.

The Device of FIGS. 1 and 2

The control device illustrated in FIGS. 1 and 2 may be used, for example, for controlling the refilling and discharging of water with respect to a tank in a toilet flushing system. The illustrated device includes a tank or reservoir 2 having an inlet 4 for feeding a liquid such as water into the reservoir, and an outlet 6 for discharging the liquid from the reservoir under the control of a valve, shown as manual valve 8. The interior of reservoir 2 is vented to the atmosphere via a vent opening 9 at its upper end.

A buoyant body, generally designated 10, is disposed within reservoir 2 in alignment with the inlet 4. The upper wall of buoyant body 10 includes a sealing pad 12 aligned with, and normally spaced below, the inner end of inlet 4, as shown in FIG. 1, such that liquid may be introduced via the inlet into the interior of the reservoir. As will be described below, buoyant body 10 is movable by buoyancy to the actuated, upper control position illustrated in FIG. 2, wherein its sealing pad 12 engages the end of inlet 4, to thereby terminate the inflow of liquid into the reservoir.

Buoyant body 10 is formed on its undersurface with a cavity 14 circumscribed by a rim 16. In the initial or lower control position of the buoyant body as illustrated in FIG. 1, rim 16 is engageable with an annular seal 18 carried by the bottom of reservoir 2. In this initial position of the buoyant body, its cavity 14 thus defines a chamber isolated from the remainder of the reservoir 2.

The illustrated control device further includes a tube 20 passing through reservoir 2 and having one end 21 leading to chamber 14 at the bottom of the buoyant body 10, with the opposite end 22 of the tube leading to an air space 23 at the upper end of the reservoir. Tube 20 thus defines a passageway which connects chamber 14 to an air space 23 at the upper end of reservoir 2.

The device illustrated in FIGS. 1 and 2 thus operates as follows:

Assuming reservoir 2 is empty, buoyant body 10 will be in its lower position illustrated in FIG. 1, wherein rim 16 at the bottom of the buoyant body engages sealing ring 18 in the bottom of reservoir 2. In this initial position of the buoyant body, its sealing pad 12 is spaced from the end of inlet 4, so that liquid may be introduced into the reservoir.

As liquid is introduced into the reservoir via inlet 4, the reservoir begins to fill. However, since chamber 14 is isolated from the remainder of the reservoir, and since the pressure in chamber 14 is relatively low (being equal to that at the upper end 22 of pipe 20 which end projects above the liquid level within the reservoir), it will be seen that the low pressure in chamber 14 will hold buoyant body 10 in its initial lower position. This holding force is increased by the weight of the liquid as more and more is introduced into the reservoir.

As soon as the liquid level in the reservoir rises to the upper end 22 of pipe 20, the liquid immediately begins to fill the pipe, thereby increasing the pressure within chamber 14. This causes the pressure within chamber 14 to rise towards that within the reservoir until the buoyancy force, which is now very large, moves the buoyant body 10 to its actuated upper position as illustrated in FIG. 2. In this upper position of the buoyant body, its sealing pad 12 engages the end of inlet 4 to terminate the inflow of liquid into the reservoir. This actuation of the buoyant body 10 from its initial lower position (FIG. 1) to its actuated upper position (FIG. 2) is thus effected with a quick snap-action.

When the liquid is discharged from reservoir 2 via outlet 6 under the control of valve 8, the level of the liquid within reservoir 2, and within pipe 20, will recede, until the weight of the buoyant body 10 moves it downwardly to cause its rim 16 to engage sealing ring 18 at the bottom of the reservoir.

Since the movement of the buoyant body 10 from its initial lower position to its upper position is not determined solely by buoyancy (but rather by the release of the low pressure within chamber 14), the buoyant body may be made relatively light, as compared to its volume, so that the buoyant body does not reach its lower control position until substantially all the liquid has been discharged from the reservoir. In such an arrangement, the buoyant body 10 would thus keep the end of inlet 4 closed until the reservoir has been substantially emptied, at which time control valve 8 in the outlet 6 would be closed.

The cross-sectional area of outlet 6 is preferably substantially larger than the cross-sectional area of inlet 4, so that the discharge of the liquid from the reservoir will be at a substantially faster rate than the influx of the liquid into the reservoir.

Figure 3:
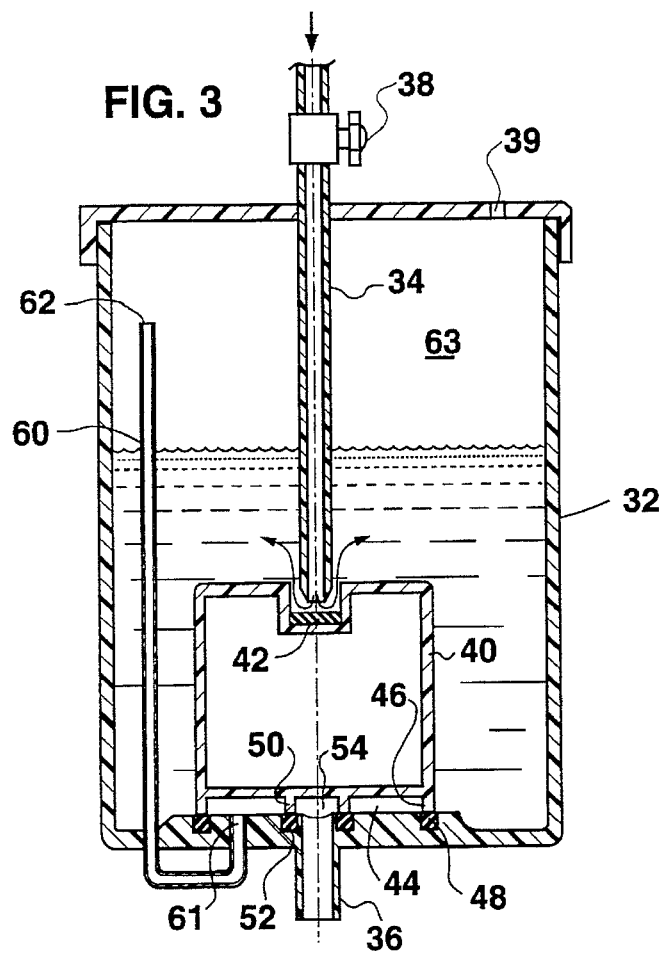
FIG. 3 illustrates another control device constructed in accordance with the invention, with the buoyant body in its initial, lower control position.
Figure 4:
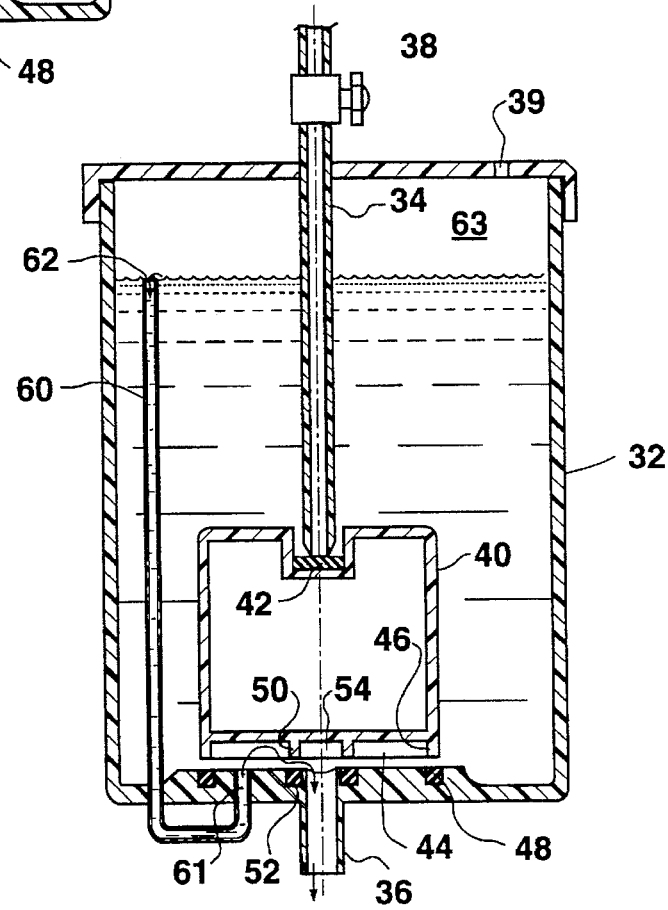
FIG. 4 illustrates the device of FIG. 3 with the buoyant body in its upper control position.

The Device of FIGS. 3 and 4

FIGS. 3 and 4 illustrate another control device in which the buoyant body is cyclically actuated between a lower control position and an upper control position. In the upper control position, the buoyant body automatically terminates the inflow of liquid into the reservoir and initiates the discharge of the liquid from the reservoir; and in the lower control position, it automatically terminates the discharge of liquid from the reservoir and initiates the inflow of liquid into the reservoir.

Thus, the control device illustrated in FIGS. 3 and 4 also includes a reservoir 32 having an inlet 34 and an outlet 36. In this case, however, the inlet 34 includes a manual valve 38 for controlling the inflow of liquid, and also the rate of such inflow, into the reservoir 32. The upper wall of reservoir 32 also includes a vent 39 for venting the upper end of the reservoir to the atmosphere.

A buoyant body, generally designated 40, is located within reservoir 32 in alignment with inlet 34. In this case, buoyant body 40 is also in alignment with the outlet 36, rather than being laterally displaced from the outlet as in FIGS. 1 and 2.

The upper wall of buoyant body 40 also includes a sealing pad 42 cooperable with inlet 34 to control the inflow of liquid into the reservoir. The bottom of buoyant body 40 also is formed with a cavity 44 circumscribed by a rim 46 engageable with a sealing ring 48 in the bottom of reservoir 32 to define a low-pressure chamber 44 in the initial, lower position of the buoyant body as illustrated in FIG. 3. In this case, however, the bottom of buoyant body 40 is formed with a second annular rim 50 cooperable with another sealing ring 52 carried by the bottom of reservoir 32 to define another chamber 54 aligned with the reservoir outlet 36.

Chamber 44 in the device of FIGS. 3 and 4 corresponds to chamber 14 in the device of FIGS. 1 and 2, except that chamber 44 is of annular configuration and is defined by the two concentric rims 46 and 50. Chamber 44 is also normally connected to a source of low pressure by a tube 60 having one end 61 leading into chamber 44, and the opposite end 62 projecting above the level of the liquid within reservoir 32 into the air space 63 above the liquid.

Chamber 54, formed in the bottom of buoyant body 40 centrally of the low pressure chamber 44, is aligned with the outlet 36 and controls the discharge of the liquid from the reservoir via that outlet.

The device illustrated in FIGS. 3 and 4 operates as follows:

Assuming reservoir 32 is empty, buoyant body 40 would be in its initial, lower control position as illustrated in FIG. 3, with rims 46 and 50 at the bottom of the buoyant body engaging sealing rings 48 and 52, respectively, at the bottom of the reservoir 32. In this position of the buoyant body, its rim 50 closes the outlet 36 so that no liquid is discharged from the reservoir; also, its sealing pad 42 is spaced from the end of inlet 34 so that liquid may be inletted into the reservoir under the control of valve 38.

As liquid is fed into the reservoir via inlet 34, the level of the liquid rises within the reservoir, thereby pressing the buoyant body 40 firmly against sealing rings 48 and 52. This firmly seals the outlet 36 and also the low-pressure chamber 44, such that the low pressure within the latter chamber firmly holds the buoyant body 40 in its lower position as illustrated in FIG. 3.

As soon as the liquid rises in the reservoir to the level of the upper end 62 of pipe 60, the liquid immediately flows into pipe 60 thereby increasing the pressure within chamber 44, to the point where the buoyancy of buoyant body 40 moves that body with a quick snap-action to its actuated position illustrated in FIG. 4. In this position, its sealing pad 42 engages inlet 34 to terminate the flow of liquid into the reservoir, and its annular rim 50 disengages from sealing ring 52 of the reservoir to thereby initiate a discharge of the liquid from the reservoir via outlet 36. As in the case of the device of FIGS. 1 and 2, the cross-sectional area of outlet 36 is substantially larger than that of inlet 34, so that the discharge from the reservoir is at a much more rapid rate than the inflow into the reservoir.

As soon as the liquid has been substantially completely discharged from the reservoir 32, buoyant body 40 will return by its own weight to its initial, lower control position, as illustrated in FIG. 3. In this position, its sealing pad 42 disengages inlet 34, and its rims 46 and 50 engage sealing rings 48 and 52 of the reservoir, to thereby open the inlet 34, restore the low pressure chamber 44, and close the outlet 36. The above-described cycle is then repeated.

The device illustrated in FIGS. 3 and 4 may thus be used as an accurate dosing device, for providing predetermined doses of a liquid. The quantity of each dose would be determined by the level of the upper end 62 of pipe 60, and if desired, the pipe may be made adjustable for this purpose. The cyclical repetition rate of the device would be determined by the rate of inflow of the liquid into reservoir 32 via inlet 34, which rate may be preset by control valve 38.

While the invention has been described with respect to two preferred embodiments, it will be appreciated that these are set forth merely for purposes of example, and that many other variations, modifications and applications of the invention may be made.

I claim:

1. A control device comprising:

a liquid reservoir having an inlet for feeding a liquid into the reservoir, and an outlet for discharging the liquid from the reservoir;

and a buoyant body within said reservoir and movable to an upper control position and to a lower control position in response to the level of the liquid in said reservoir;

said buoyant body including an outer surface normally engageable with a surface of the reservoir in said lower control position but movable by buoyancy away from said surface of the reservoir towards said upper control position during filling of the reservoir with liquid; characterized in that said outer surface of the buoyant body includes a cavity circumscribed by a rim engageable with said surface of the reservoir in said lower control position of the buoyant body to define a chamber isolated from the reservoir when the liquid is at a low level within said reservoir;

and in that said device includes a passageway which normally connects said chamber to a source of low pressure but which is connectible to a source of higher pressure, such that during the filling of the reservoir with the liquid, the low pressure applied to said chamber by said low pressure source normally holds the buoyant body in said lower control position until the chamber is connected by said passageway to said source of higher pressure to permit the buoyant body to move by buoyancy to said upper control position.

2. The device according to claim 1, wherein said outer surface of the buoyant body is at the bottom of the buoyant body, and said surface of the reservoir normally engageable by the buoyant body is at the bottom of said reservoir.

3. The device according to claim 2, wherein said source of low pressure is the atmosphere.

4. The device according to claim 2, wherein said passageway is defined by a pipe leading from said chamber to a high point within said reservoir above the buoyant body when in its lower control position, such that said chamber is pressurized by the liquid via said passageway when the liquid reaches said high point in the reservoir to thereby permit the buoyant body to move by buoyancy to its upper control position.

5. The device according to claim 4, wherein the upper end of the interior of said reservoir is vented to the atmosphere.

6. The device according to claim 2, wherein said lower control position of the buoyant body is aligned with and spaced below said inlet, and said upper control position of the buoyant body is against said inlet to terminate the liquid flow therethrough.

7. The device according to claim 2, wherein said inlet is of a cross-sectional area smaller than that of said outlet.

8. The device according to claim 2, wherein said outlet is in the bottom of said reservoir laterally of said chamber defined by the buoyant body and the bottom of the reservoir, and includes a valve for controlling the outletting of the liquid from said reservoir.

9. The device according to claim 2, wherein said outlet is in the bottom of said reservoir aligned with said buoyant body and the chamber defined by it and the bottom of the reservoir such that the outlet is automatically closed when the buoyant body moves to its lower control position, and is automatically opened when the buoyant body moves to its upper control position.

10. The device according to claim 9, wherein the bottom surface of said buoyant body includes a second rim circumscribed by said first-mentioned rim such that the two rims are engageable with the bottom surface of the reservoir to define therewith said compartment communicating with said passageway, and an outlet chamber centrally of said chamber communicating with said reservoir outlet.

11. The device according to claim 10, wherein said inlet includes a control valve for controlling the rate of feeding of the liquid into the reservoir via said inlet.

12. A control device comprising:

a liquid reservoir having an inlet for feeding a liquid into the reservoir, and an outlet of larger cross-sectional area than said inlet for discharging the liquid from the reservoir;

and a buoyant body within said reservoir and movable to an upper control position and to a lower control position in response to the level of the liquid in said reservoir;

said buoyant body including an outer surface at its bottom normally engageable with a bottom surface of the reservoir in said lower control position but movable by buoyancy away from said bottom surface of the reservoir towards said upper control position during filling of the reservoir with liquid;

said outer surface of the buoyant body including a cavity circumscribed by a rim engageable with said bottom surface of the reservoir in said lower control position of the buoyant body to define a chamber isolated from the reservoir when the liquid is at a low level within said reservoir;

said device further including a passageway which normally connects said chamber to a source of low pressure but which is connectible to a source of higher pressure, such that during the filling of the reservoir with the liquid, the low pressure applied to said chamber by said low pressure source normally holds the buoyant body in said lower control position until the chamber is connected by said passageway to said source of higher pressure to permit the buoyant body to move by buoyancy to said upper control position.

13. The device according to claim 12, wherein said source of low pressure is the atmosphere, and the upper end of the interior of said reservoir is vented to the atmosphere.

14. The device according to claim 12, wherein said passageway is defined by a pipe leading from said chamber to a high point within said reservoir above the buoyant body when in its lower control position, such that said chamber is pressurized by the liquid via said passageway when the liquid reaches said high point in the reservoir to thereby permit the buoyant body to move by buoyancy to its upper control position.

15. The device according to claim 12, wherein said lower control position of the buoyant body is aligned with and spaced below said inlet, and said upper control position of the buoyant body is against said inlet to terminate the liquid flow therethrough.

16. The device according to claim 12, wherein said outlet is in the bottom of said reservoir laterally of said chamber defined by the buoyant body and the bottom of the reservoir, and includes a valve for controlling the outletting of the liquid from said reservoir.

17. The device according to claim 12, wherein said outlet is in the bottom of said reservoir aligned with said buoyant body and the chamber defined by it and the bottom of the reservoir such that the outlet is automatically closed when the buoyant body moves to its lower control position, and is automatically opened when the buoyant body moves to its upper control position.

18. The device according to claim 17, wherein the bottom surface of said buoyant body includes a second rim circumscribed by said first-mentioned rim such that the two rims are engageable with the bottom surface of the reservoir to define therewith said compartment communicating with said passageway, and an outlet chamber centrally of said chamber communicating with said reservoir outlet.

19. The device according to claim 18, wherein said inlet includes a control valve for controlling the rate of feeding of the liquid into the reservoir via said inlet.

* * * * *